Aug. 6, 1929.  S. G. DOWN  1,723,141
AUTOMOTIVE BRAKE
Filed Dec. 8, 1926
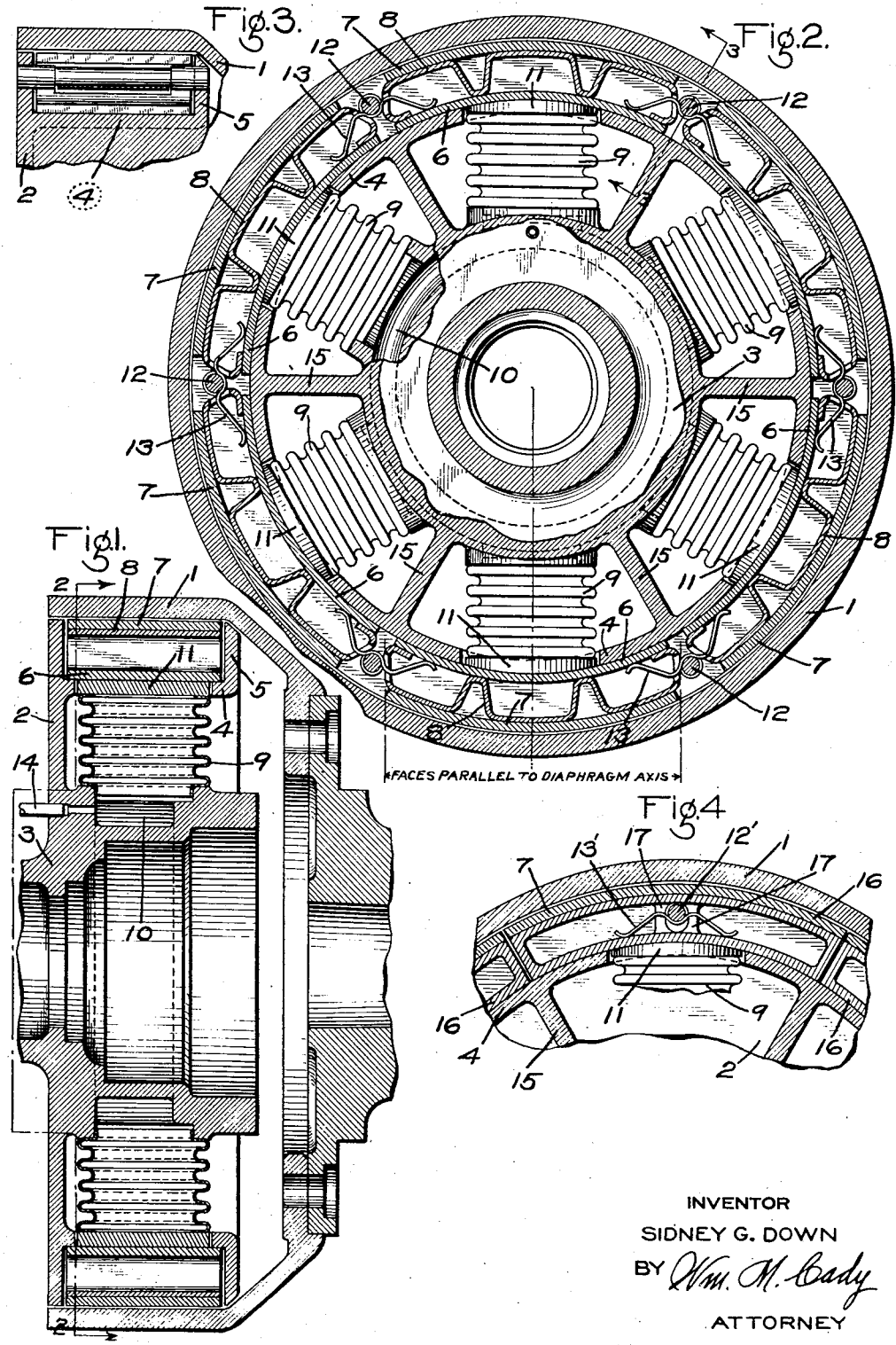
INVENTOR
SIDNEY G. DOWN
BY Wm. H. Cady
ATTORNEY Patented Aug. 6, 1929.

1,723,141

UNITED STATES PATENT OFFICE.

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed December 8, 1926. Serial No. 153,257.

This invention relates to brakes, and more particularly to a brake of the internal expanding drum type, such as is employed on motor vehicles.

The principal object of my invention is to provide an improved fluid pressure operated brake of the drum type.

Other objects and advantages will appear in the following more detailed description of the invention.

In the accompanying drawing; Fig. 1 is a vertical section of a motor vehicle drum brake, embodying my invention; Fig. 2 a section on the line 2—2 of Fig. 1; Fig. 3 a section on the line 3—3 of Fig. 2; and Fig. 4 a sectional view of a portion of a drum brake, showing a slightly modified form of my invention.

As shown in the drawing, a drum 1 is fixed to each vehicle wheel which is to be braked, said drum having an internal friction face adapted to be engaged by non-rotating braking members. Mounted within said drum and fixed to a non-rotating part of the vehicle is a carrier for the braking members, comprising a vertically disposed plate 2 carried by a stationary hub portion 3 and having an inwardly extending annular flange 4. At the inner end of the flange 4 an annular upwardly extending flange 5 is provided, so that the upper portion of the plate 2 and the flanges 4 and 5 form an annular pocket adapted to receive the braking members.

Mounted intermediate the drum 1 and the flange 4 are a plurality of brake heads, each of which comprises an inner arcuate segment 6, an outer arcuate segment 7 having a friction face adapted to engage the internal friction face of the drum 1, and a spacing member 8 which may comprise a strip of metal having folds which extend from the outer segment 7 to the inner segment 6, so that portions of the member 8 engage the segment 6 and other portions engage the segment 7. Air spaces are thus provided between the outer and inner segments, which permit the heat generated by frictional engagement between the segments 7 and the drum 1 from being conducted to the inner parts.

Disposed centrally of each brake head is a corrugated or circumferentially convoluted flexible metallic diaphragm 9 having one end brazed into an opening formed in the hub portion, each of said openings communicating with an annular chamber 10 provided in the hub section 3. The upper end of each diaphragm 9 is closed by a pressure plate 11 which extends through an opening in the flange 4 and is adapted to engage a corresponding inner segment 6.

Interposed between the adjacent ends of the spacing members 8 are transversely disposed retaining pins 12 which are secured in openings provided in the flange 5 and the plate 2, and the opposing engaging faces of the folded ends of each member 8 are in planes parallel with the axis of the corresponding diaphragm 9, so that said ends are maintained in engagement with the retaining pins when the brake heads are moved outwardly due to wear.

Spring clips 13 held in place by the pins 12 are provided with the opposite portions adapted to engage adjacent segments 6 and press said segments inwardly, said spring clips extending through openings provided in the end portions of the spacing members 8.

A pipe 14 is connected to chamber 10, through which fluid under pressure is supplied to and released from the chamber 10.

When it is desired to apply the brakes, fluid under pressure or liquid is supplied through pipe 14 to the chamber 10 and is simultaneously supplied from chamber 10 to the flexible diaphragms 9. Said diaphragms are then radially expanded, causing the pressure heads 11 to move the inner segments 6 outwardly, so that the outer segments 7 frictionally engage the internal friction face of the drum 1, thus opposing the rotating movement of the drum and producing the desired braking action.

When it is desired to release the brakes, fluid under pressure is released from chamber 10 through the pipe 14, and fluid being released from the diaphragms 9, the springs 13 operate to move the brake head members inwardly, so that the segments 7 are moved out of frictional engagement with the drum 1.

Radial ribs 15 may be provided intermediate the diaphragms 9 and connecting the flange 4 and the hub portion 3, so as to strengthen the structure.

Instead of employing brake heads of the type shown in Figs. 1 and 2, a brake head may be employed as shown in Fig. 4, comprising an arcuate segment 16 having outer and inner arcuate walls and end walls, the outer wall being attached to the segment 7 and the inner wall engaging the pressure block 11. In this case, the retaining pin 12' may be disposed centrally of each segment 16, said pin engaging radial members 17 connecting the arcuate walls of the head, to prevent rotative movement of the brake head. The spring clip 13' is held in position by the pin 12' and engages the inner wall of the brake head.

Having now described my invention, what I claim as new and desire to secure by Letters Patent, is:—

1. In a fluid pressure brake, the combination with a rotating brake drum having an internal friction face, of a non-rotatable member having an annular chamber provided with radial openings, an annular flange carried by said member and provided with openings in axial alinement with said radial openings, a cylindrical corrugated diaphragm interiorly communicating with each said radial opening, and a brake head movable radially by each diaphragm to engage said friction face, said diaphragms being operatively connected to said brake heads through the openings in said flange and being radially expanded by fluid under pressure supplied to said chamber.

2. In a brake, the combination with a brake drum, of a plurality of braking units within said drum, each unit comprising a flexible diaphragm, an inner segment radially operable by said diaphragm, an outer segment adapted to engage said drum, and a spacing member intermediate said segments and formed of a metal strip having folds and end portions provided with outer faces parallel with the axis of said diaphragm, and pins engaging said faces to guide the radial movement of said braking unit.

In testimony whereof I have hereunto set my hand.

SIDNEY G. DOWN.